(12) United States Patent
Bivens et al.

(10) Patent No.: US 10,635,475 B2
(45) Date of Patent: Apr. 28, 2020

(54) MIGRATION-ADJUSTED PROBLEM TICKET ANALYSIS AND CONSOLIDATION

(71) Applicant: International Business Machines Corporation, Armonk, NY (US)

(72) Inventors: John A. Bivens, Ossining, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 15/592,359

(22) Filed: May 11, 2017

(65) Prior Publication Data

US 2018/0329734 A1    Nov. 15, 2018

(51) Int. Cl.
*G06F 9/455* (2018.01)
*G06Q 30/00* (2012.01)

(52) U.S. Cl.
CPC .. *G06F 9/45558* (2013.01); *G06F 2009/4557* (2013.01); *G06F 2009/45591* (2013.01); *G06Q 30/016* (2013.01)

(58) Field of Classification Search
None
See application file for complete search history.

(56) References Cited

U.S. PATENT DOCUMENTS

| 7,493,518 B2 | 2/2009 | Anderson et al. |
| 2014/0059395 A1* | 2/2014 | Mahindru ............... G06F 11/07 714/48 |

\* cited by examiner

*Primary Examiner* — Eric C Wai
(74) *Attorney, Agent, or Firm* — Scully, Scott, Murphy & Presser, P.C.; Samuel Waldbaum, Esq.

(57) ABSTRACT

Problem ticket analysis and consolidation are performed by monitoring a virtual computing environment including at least a first physical host, a second physical host, and one or more virtual machines, to detect one or more problems. A problem ticket is opened in response to detecting at least one problem of the one or more problems at the one or more virtual machines, the first physical host or the second physical host. A migration is identified for a virtual machine of the one or more virtual machines from the first physical host to the second physical host. A plurality of problem tickets are analyzed to identify at least two correlated problem tickets. The identified at least two problem tickets are consolidated into a single problem ticket.

20 Claims, 6 Drawing Sheets

MIGRATION-ADJUSTED PROBLEM TICKET ANALYSIS AND CONSOLIDATION

FIELD

The present application relates generally to cloud computing and, more particularly, to monitoring, identifying, and reporting problems in a virtual computing environment.

BACKGROUND

Cloud computing offers a virtual environment where several operating system images may be concurrently executed on a server as virtual machines (VMs). A VM can migrate from one physical host to another during run time to fulfill availability requirements, for maintenance reasons, or to mitigate performance, capacity, power, or temperature problems, among other reasons. A system support mechanism monitors operation of the virtual environment, and generates problem tickets for events that cause problems. These problem tickets may be resolved by one or more system administrators. Every open problem ticket has to be handled by system administrators, consuming time and effort, regardless of whether or not an issue corresponding to the problem ticket has already been resolved. Moreover, system administrators may be called upon to determine whether or not several different problem tickets were opened for an identical problem or failure. Thus, there exists a need to overcome at least one of the preceding deficiencies and limitations of the related art.

SUMMARY

The following summary is merely intended to be exemplary. The summary is not intended to limit the scope of the claims.

A computer-implemented method for performing problem ticket analysis and consolidation, in one aspect, may comprise monitoring a virtual computing environment including one or more virtual machines, and at least a first physical host and a second physical host, to detect one or more problems; opening one or more respective problem tickets in response to detecting one or more corresponding problems at the one or more virtual machines, or at the first physical host, or at the second physical host; identifying a migration of a virtual machine of the one or more virtual machines from the first physical host to the second physical host; analyzing a plurality of problem tickets including the one or more respective problem tickets, to identify a first problem ticket that is correlated with a second problem ticket; and consolidating the first problem ticket and the second problem ticket into a single problem ticket.

A computer program product for performing problem ticket analysis and consolidation, in another aspect, may comprise a computer-readable storage medium having a computer-readable program stored therein, wherein the computer-readable program, when executed on a processor, causes the processor to monitor a virtual computing environment including one or more virtual machines, and at least a first physical host and a second physical host, to detect one or more problems; open one or more respective problem tickets in response to detecting one or more corresponding problems at the one or more virtual machines, or at the first physical host, or at the second physical host; identify a migration of a virtual machine of the one or more virtual machines from the first physical host to the second physical host; analyze a plurality of problem tickets including the one or more respective problem tickets, to identify a first problem ticket that is correlated with a second problem ticket; and consolidate the first problem ticket and the second problem ticket into a single problem ticket.

An apparatus for performing trouble ticket analysis and consolidation, in another aspect, may comprise a processor and a memory coupled to the processor, wherein the memory comprises instructions which, when executed by the processor, cause the processor to monitor a virtual computing environment including one or more virtual machines, and at least a first physical host and a second physical host, to detect one or more problems; open one or more respective problem tickets in response to detecting one or more corresponding problems at the one or more virtual machines, or at the first physical host, or at the second physical host; identify a migration of a virtual machine of the one or more virtual machines from the first physical host to the second physical host; analyze a plurality of problem tickets including the one or more respective problem tickets, to identify a first problem ticket that is correlated with a second problem ticket; and consolidate the first problem ticket and the second problem ticket into a single problem ticket.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
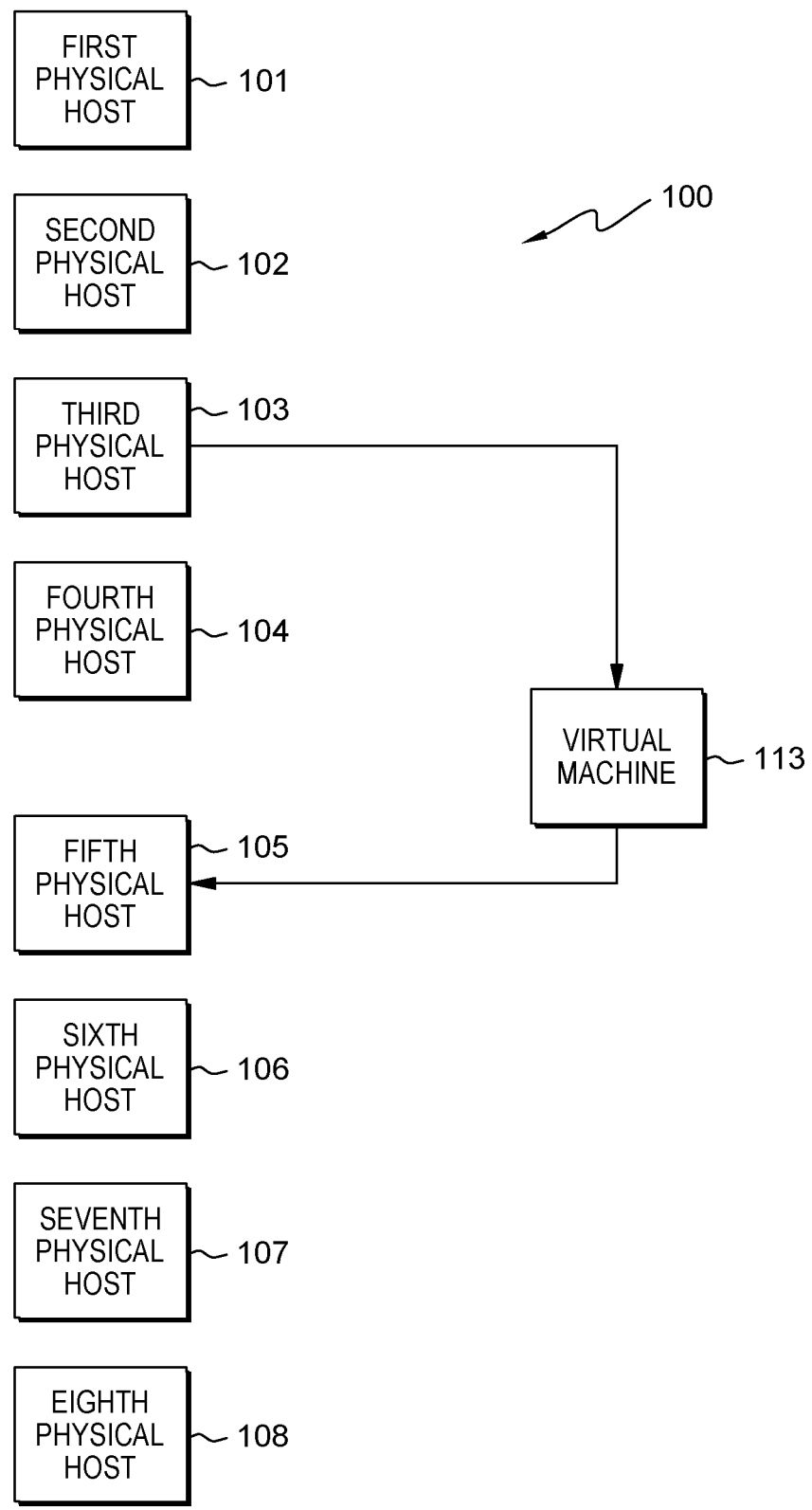
FIG. 1 illustrates a virtual environment in accordance with one or more embodiments of the present invention.

FIG. 1 illustrates a virtual environment 100 in accordance with one or more embodiments of the present invention. The virtual environment 100 includes a first physical host 101, a second physical host 102, a third physical host 103, a fourth physical host 104, a fifth physical hosts 105, a sixth physical host 106, a seventh physical host 107, and an eighth physical host 108. Each physical host is controlled by a corresponding hypervisor. A virtual machine 113 can be migrated from one physical host to another physical host for any of a number of reasons, including maintenance, performance, resource utilization, capacity, server consolidation, power savings, reliability, or availability. For example, the virtual machine 113 may be migrated from the third physical host 103 to the fifth physical host 105. A migration may be performed using a live migration procedure or an offline migration procedure. A live migration involves a virtual machine's operation being substantially not interrupted, almost not interrupted, or interrupted for a very brief period of time, without subjecting users to downtime. The offline migration procedure requires stopping the virtual machine, for example, on the third physical host 103, and restarting it at the fifth physical host 105.

When the virtual machine 113 is migrated from one physical host to another, some of the problem tickets that were opened for that virtual machine 113 may no longer be relevant to the virtual machine 113. For example, a certain problem may be related to or caused by a specific physical host, such as the third physical host 103. When the virtual machine 113 is migrated from the third physical host 103 to the fifth physical host 105, the problem may no longer exist. Moreover, a plurality of virtual machines on the third physical host 103 may be generating problem tickets due to high resource consumption. However, when the virtual machine 113 is migrated from the third physical host 103 to the fifth physical host 105, the virtual machines remaining on the third physical host 103 may no longer experience any problems due to high resource consumption, as the migration of the virtual machine 113 to the fifth physical host 105 may have reduced resource consumption of the third physical host 103 to an acceptable level. Thus, problem tickets relating to the virtual machines remaining on the third physical host 103 after the virtual machine 113 has migrated to the fifth physical host 105 may no longer be relevant problem tickets. Problem tickets that are no longer relevant need to be identified and marked.

Figure 2:
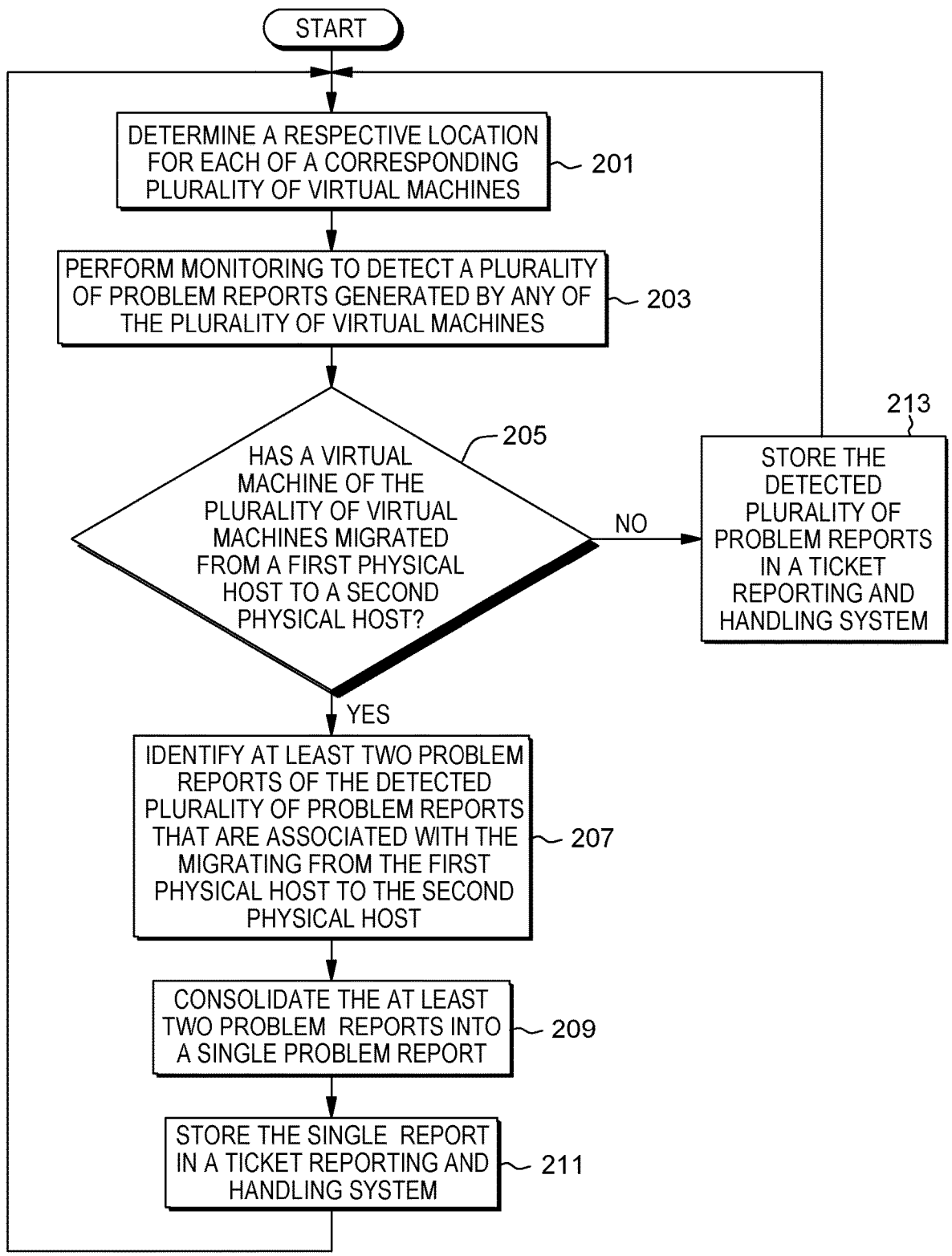
FIG. 2 illustrates a first exemplary method for analyzing and consolidating problem tickets in accordance with one or more embodiments of the present invention.

FIG. 2 illustrates a first exemplary method for analyzing and consolidating problem tickets in accordance with one or more embodiments of the present invention. The operational sequence commences at block 201 where a respective location is determined for each of a corresponding plurality of virtual machines, i.e. the name of the physical host where the virtual machine is hosted. Next, at block 203, monitoring is performed to detect a plurality of problem reports that are generated by any of the plurality of virtual machines. At block 205, a test is performed to ascertain whether or not a virtual machine of the plurality of virtual machines (such as the virtual machine 113, FIG. 1) has migrated from a first physical host (such as the first physical host 101) to a second physical host (such as the second physical host 102.) This test may be performed using the location information that was determined at block 201 (FIG. 2). The negative branch from block 205 leads to block 213 where the detected plurality of problem reports are stored in a ticket reporting and handling system, and the program loops back to block 201.

The affirmative branch from block 205 leads to block 207 where at least two problem reports of the detected plurality of problem reports are identified. For illustrative purposes, the at least two problem reports may, but need not, be associated with migrating the virtual machine from the first physical host to the second physical host, either reported by that virtual machine itself, or reported by one of more virtual machines hosted on the first physical host. Then, at block 209, the at least two problem reports are analyzed, and if determined correlated, they are consolidated into a single problem report. The single problem report is stored in the ticket reporting and handling system (block 211). The program then loops back to block 201.

Figure 3:
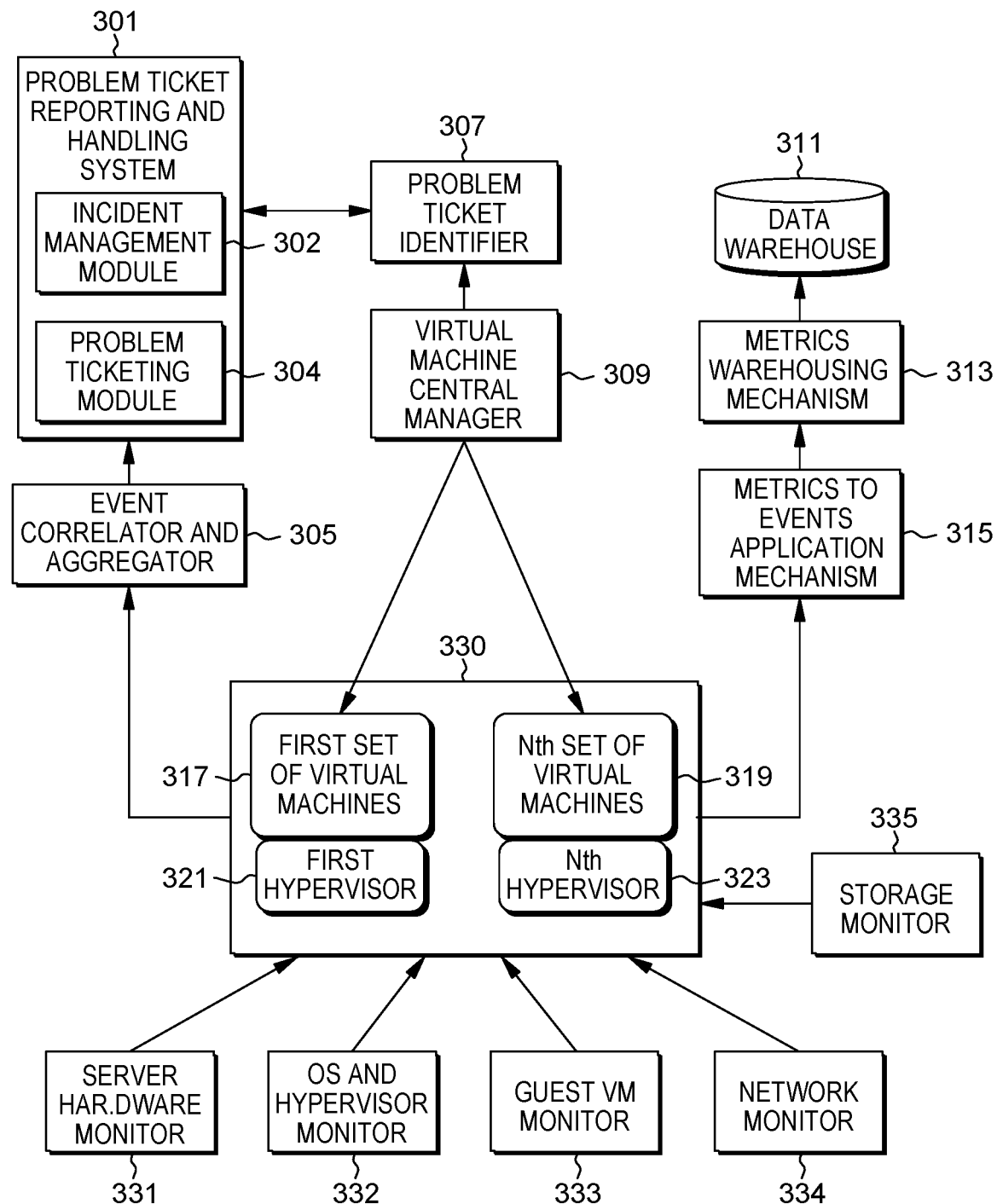
FIG. 3 illustrates a system for analyzing and consolidating problem tickets in accordance with one or more embodiments of the present invention.

FIG. 3 illustrates a system for analyzing and consolidating problem tickets in accordance with one or more embodiments of the present invention. A virtual environment 330 includes a first set of virtual machines 317 operatively coupled to a first hypervisor 321, and an Nth set of virtual machines 319 operatively coupled to an Nth hypervisor 323, where N is a positive integer greater than zero. The first hypervisor 321 and the Nth hypervisor 323 each comprise virtual machine monitors implemented as computer hardware, computer software, firmware, or any of various combinations thereof. The first hypervisor 321 and the Nth hypervisor 323 are each configured for creating and running one or more virtual machines. A computer on which a hypervisor is running one or more virtual machines may be defined as a host machine. Each of the one or more virtual machines may be called a guest machine. A virtual machine central manager 309 manages the virtual environment 330.

The virtual environment 330 is monitored by a plurality of probes, including a server hardware monitor 331, an operating system (OS) hypervisor monitor 332, a guest virtual machine monitor 333, a network monitor 334, and a storage monitor 335. An event correlator and aggregator 305 receives information from any of the probes to generate event information. The event information may identify one or more problems. In response to event information that is indicative of a detected problem, the event information is forwarded to a problem ticket reporting and handling system 301. The problem ticket reporting and handling system 301 may include an incident management module 302 for receiving the event information, and a problem ticketing module 304 operatively coupled to the incident management module 302 for creating problem tickets. The problem ticket is associated with a problem ticket identifier 307. The problem ticket may include one or more of a customer name, an event description, a severity, the virtual machine name, or a pool identifier.

In parallel, the generated event information and a plurality of metrics is fed to a metrics to events application mechanism module 315. A metrics warehousing mechanism 313 is configured for storing event information and associated metrics in a data warehouse 311. The event information and associated metrics in the data warehouse 311 may be analyzed offline.

Figure 4A:
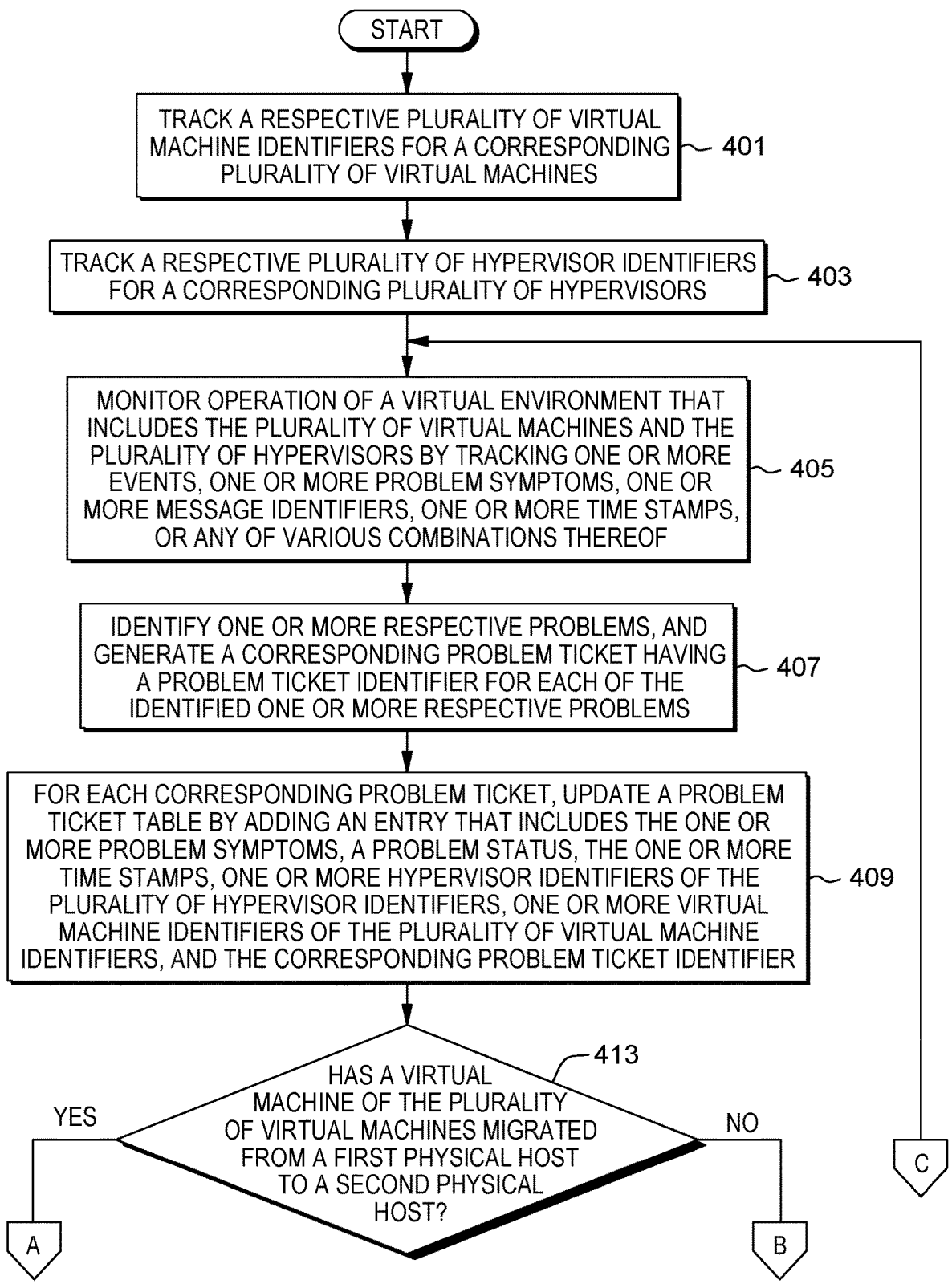
FIGS. 4A and 4B together comprise a flowchart illustrating a second exemplary method for analyzing and consolidating problem tickets in accordance with one or more embodiments of the present invention.
Figure 4B:
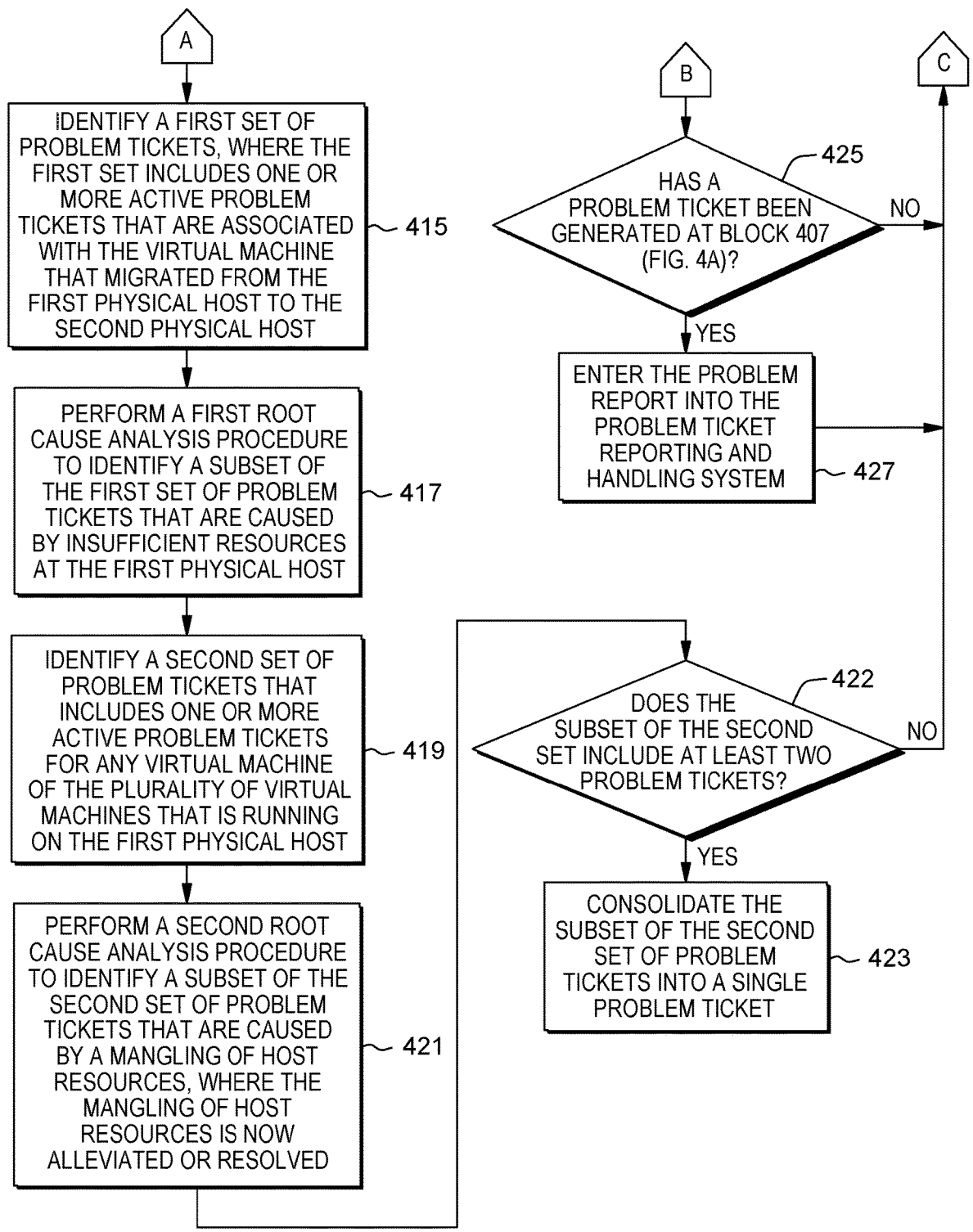

FIGS. 4A and 4B together comprise a flowchart illustrating a second exemplary method for analyzing and consolidating problem tickets in accordance with one or more embodiments of the present invention. The operational sequence commences at block 401 (FIG. 4A) where a respective plurality of virtual machine identifiers are tracked for a corresponding plurality of virtual machines including, for example, the first and Nth sets of virtual machines 317 and 319 (FIG. 3). At block 403 (FIG. 4A), a respective plurality of hypervisor identifiers are tracked for a corresponding plurality of hypervisors including, for example, the first hypervisor 321 and the Nth hypervisor 323 (FIG. 3). It may be noted that blocks 401 and 403 (FIG. 4A) may be performed concurrently or in any order. The operations of blocks 401 and 403 may be employed to map specific virtual machines and hypervisors to specific physical hosts, so as to enable an identification of the virtual machines and hypervisors that are running on a particular physical host at any point in time.

Next, at block 405, the operation of the virtual environment 330 (FIG. 3) is monitored. The virtual environment 330 includes the first set of virtual machines 317, the Nth set of virtual machines 319, the first hypervisor 321, and the Nth hypervisor 323. The monitoring is performed by tracking one or more events, one or more problem systems, one or more message identifiers, one or more time stamps, or any of various combinations thereof. Then, at block 407 (FIG. 4A), one or more respective problems are identified. A corresponding problem ticket having a problem ticket identifier is generated for each of the identified one or more respective problems. The problem ticket may be conceptualized as a problem report.

The operational sequence progresses to block 409. For each corresponding problem ticket, a problem ticket table is updated by adding an entry that includes the one or more problem symptoms, a problem status (such as active, resolved, or solution pending), the one or more time stamps, one or more hypervisor identifiers of the plurality of hypervisor identifiers, one or more virtual machine identifiers of the plurality of virtual machine identifiers, and the corresponding problem ticket identifier. The problem ticket table may be maintained, for example, by the problem ticket reporting and handling system 301 (FIG. 3).

Next, at block 413 (FIG. 4A), a test is performed to ascertain whether or not a virtual machine of the plurality of virtual machines has migrated from a first physical host to a second physical host. If not, the program advances to block 425 (FIG. 4B) where a test is performed to ascertain whether or not a problem ticket has been previously generated at block 407 (FIG. 4A). If so, the problem ticket is stored in the problem ticket reporting and handling system 301 (FIG. 3), and the program loops back to block 405 (FIG. 4A). The negative branch from block 425 (FIG. 4B) also loops back to block 405 (FIG. 4A).

The affirmative branch from block 413 (FIG. 4A) leads to block 415 (FIG. 4B) where a first set of problem tickets is identified. The first set of problem tickets includes one or more active problem tickets that are associated with the virtual machine that migrated from the first physical host to the second physical host. Then, at block 417, a first root cause analysis procedure is performed to identify a subset of the first set of problem tickets that are caused by insufficient resources at the first physical host, or some other problem associated with the first physical host.

The operational sequence advances to block 419 (FIG. 4B) where a second set of problem tickets are identified that include one or more active problem tickets for any virtual machine of the plurality of virtual machines that is running on the first physical host. A second root cause procedure is performed at block 421 to identify a subset of the second set of problem tickets that are caused by a mangle or erroneous mixing of host resources, where the mangle or erroneous mixing of host resources is now alleviated or resolved. At block 422, a test is performed to determine whether or not the subset of the second set includes at least two problem tickets. If so, at block 423, the subset of the second set of problem tickets is consolidated into a single problem ticket. Alternatively or additionally, the subset of the second set of problem tickets may be temporarily held or delayed pending receipt of possible additional problem tickets, or earmarked as tickets that may have previously been addressed in part or in total by a recent virtual machine migration. The negative branch from block 422 leads back to block 405 (FIG. 4A).

Figure 5:
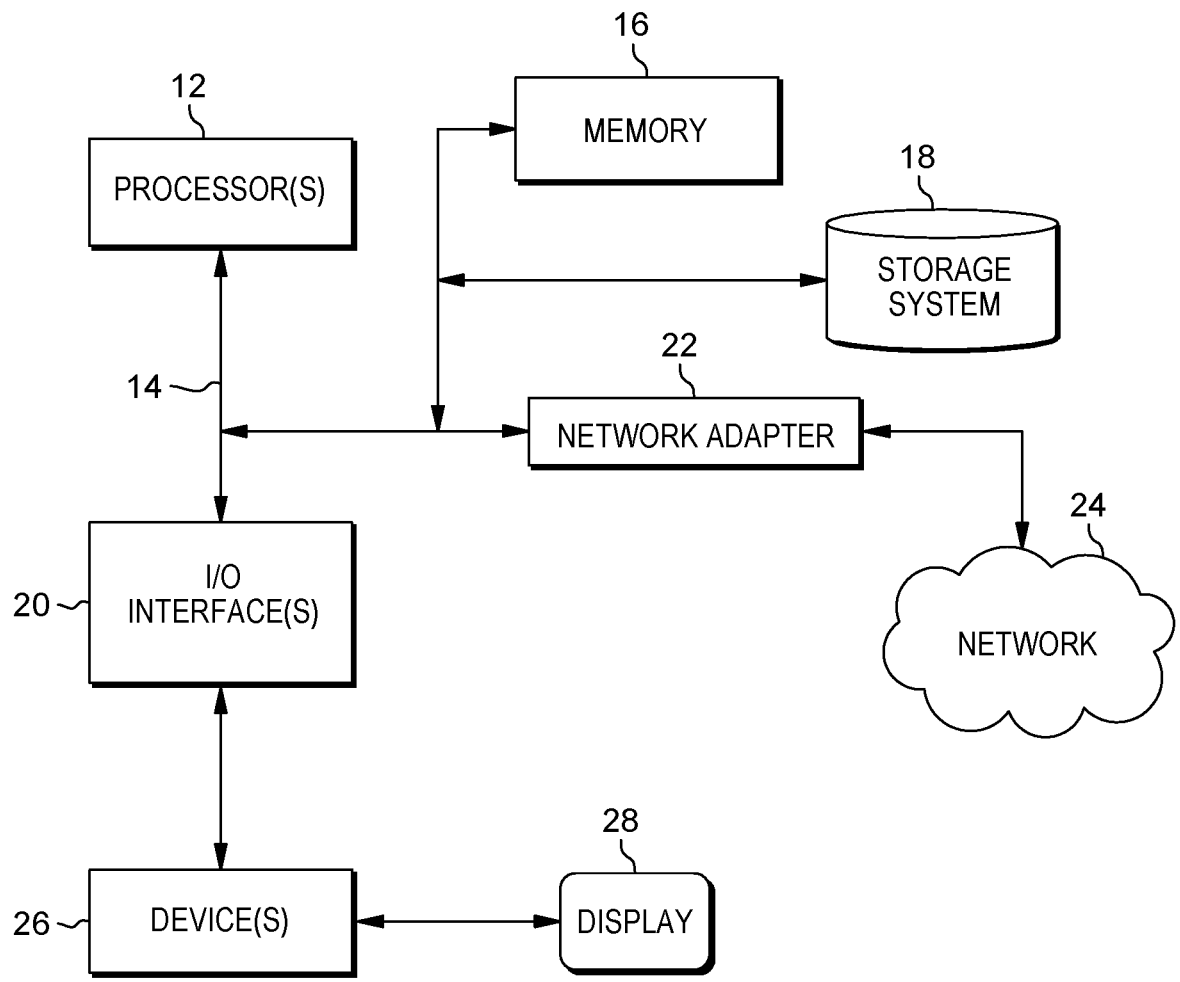
FIG. 5 illustrates an exemplary apparatus for analyzing and consolidating problem tickets in accordance with in accordance with one or more embodiments of the present invention.

FIG. 5 illustrates an exemplary apparatus for analyzing and consolidating problem tickets in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing problem ticket analysis and consolidation, the method comprising:
    monitoring a virtual computing environment including one or more virtual machines, and at least a first physical host and a second physical host, to detect one or more problems;
    opening one or more respective problem tickets in response to detecting one or more corresponding problems at the one or more virtual machines, or at the first physical host, or at the second physical host;
    identifying a migration of a virtual machine of the one or more virtual machines from the first physical host to the second physical host;
    identifying a first set of active problem tickets including one or more active problem tickets associated with the migrated virtual machine;
    performing a first root cause analysis to identify a subset of the first set of one or more active problem tickets that are caused by insufficient resources at the first physical host;
    identifying a second set of active problem tickets including one or more active problem tickets associated with the first physical host;
    performing a second root cause analysis to identify a subset of the second set of one or more active problem tickets that are caused by a mangle of host resources at the first physical host and whose mangling of host resources has been alleviated or resolved; and
    consolidating a first problem ticket and a second problem ticket of said subset of the second set of active problem tickets into a single problem ticket.

2. The computer-implemented method of claim 1, wherein the monitoring is performed by tracking one or more events, one or more problem systems, one or more message identifiers, one or more time stamps, or any of various combinations thereof.

3. The computer-implemented method of claim 1, wherein the identifying is performed by tracking a respective plurality of virtual machine identifiers for a corresponding plurality of virtual machines.

4. The computer-implemented method of claim 1, wherein the identifying is performed by tracking a respective plurality of hypervisor identifiers for a corresponding plurality of hypervisors.

5. The computer-implemented method of claim 4 wherein the corresponding plurality of hypervisors comprises a first hypervisor and a second hypervisor, and the method further comprising mapping the first hypervisor to the first physical host, and mapping the second hypervisor to the second physical host.

6. The computer-implemented method of claim 1 wherein the consolidating further comprises temporarily holding or delaying the identified first and second problem tickets, pending receipt of additional problem tickets.

7. The computer-implemented method of claim 1 wherein the consolidating further comprises temporarily holding or delaying the consolidated single problem ticket, pending receipt of additional problem tickets.

8. The computer-implemented method of claim 1 wherein the consolidating further comprises earmarking the identified first and second problem tickets, or earmarking the consolidated single problem ticket, as tickets that were previously addressed in part or in total by a recent virtual machine migration.

9. A computer program product for performing problem ticket analysis and consolidation, the computer program product comprising a computer-readable storage medium having a computer-readable program stored therein, wherein the computer-readable program, when executed on a processor, causes the processor to:
    monitor a virtual computing environment including one or more virtual machines, and at least a first physical host and a second physical host, to detect one or more problems;
    open one or more respective problem tickets in response to detecting one or more corresponding problems at the one or more virtual machines, or at the first physical host, or at the second physical host;
    identify a migration of a virtual machine of the one or more virtual machines from the first physical host to the second physical host;
    identify a first set of active problem tickets including one or more active problem tickets associated with the migrated virtual machine;
    perform a first root cause analysis to identify a subset of the first set of one or more active problem tickets that are caused by insufficient resources at the first physical host;
    identify a second set of active problem tickets including one or more active problem tickets associated with the first physical host;
    perform a second root cause analysis to identify a subset of the second set of one or more active problem tickets that are caused by a mangle of host resources at the first physical host and whose mangling of host resources has been alleviated or resolved; and
    consolidate a first problem ticket and a second problem ticket of said subset of the second set of active problem tickets into a single problem ticket.

10. The computer program product of claim 9, further configured for performing the monitoring by tracking one or more events, one or more problem systems, one or more message identifiers, one or more time stamps, or any of various combinations thereof.

11. The computer program product of claim 9, further configured for performing the identifying by tracking a respective plurality of virtual machine identifiers for a corresponding plurality of virtual machines.

12. The computer program product of claim 9, further configured for performing the identifying by tracking a respective plurality of hypervisor identifiers for a corresponding plurality of hypervisors.

13. The computer program product of claim 12, wherein the corresponding plurality of hypervisors comprises a first hypervisor and a second hypervisor, and the computer program product is further configured for mapping the first hypervisor to the first physical host, and mapping the second hypervisor to the second physical host.

14. The computer program product of claim 9 wherein the consolidating further comprises temporarily holding or delaying the identified first and second problem tickets, pending receipt of additional problem tickets.

15. The computer program product of claim 9 wherein the consolidating further comprises temporarily holding or delaying the consolidated single problem ticket, pending receipt of additional problem tickets.

16. The computer program product of claim 9 wherein the consolidating further comprises earmarking the identified first and second problem tickets, or earmarking the consolidated single problem ticket, as tickets that were previously been addressed in part or in total by a recent virtual machine migration.

17. An apparatus for performing problem ticket analysis and consolidation, the apparatus comprising a processor and a memory coupled to the processor, wherein the memory comprises instructions which, when executed by the processor, cause the processor to:
    monitor a virtual computing environment including one or more virtual machines, and at least a first physical host and a second physical host, to detect one or more problems;
    open one or more respective problem tickets in response to detecting one or more corresponding problems at the one or more virtual machines, or at the first physical host, or at the second physical host;
    identify a migration of a virtual machine of the one or more virtual machines from the first physical host to the second physical host;
    identify a first set of active problem tickets including one or more active problem tickets associated with the migrated virtual machine;
    perform a first root cause analysis to identify a subset of the first set of one or more active problem tickets that are caused by insufficient resources at the first physical host;
    identify a second set of active problem tickets including one or more active problem tickets associated with the first physical host;
    perform a second root cause analysis to identify a subset of the second set of one or more active problem tickets that are caused by a mangle of host resources at the first physical host and whose mangling of host resources has been alleviated or resolved;
    analyze a plurality of problem tickets including the one or more respective problem tickets, to identify a first problem ticket that is correlated with a second problem ticket; and
    consolidate a first problem ticket and a second problem ticket of said subset of the second set of active problem tickets into a single problem ticket.

18. The apparatus of claim 17, further configured for performing the monitoring by tracking one or more events, one or more problem systems, one or more message identifiers, one or more time stamps, or any of various combinations thereof.

19. The apparatus of claim 17, further configured for performing the identifying by tracking a respective plurality of virtual machine identifiers for a corresponding plurality of virtual machines.

20. The apparatus of claim 17, further configured for performing the identifying by tracking a respective plurality of hypervisor identifiers for a corresponding plurality of hypervisors.

* * * * *